(No Model.)
W. C. METZNER.
STOVE DAMPER.
No. 410,646. Patented Sept. 10, 1889.
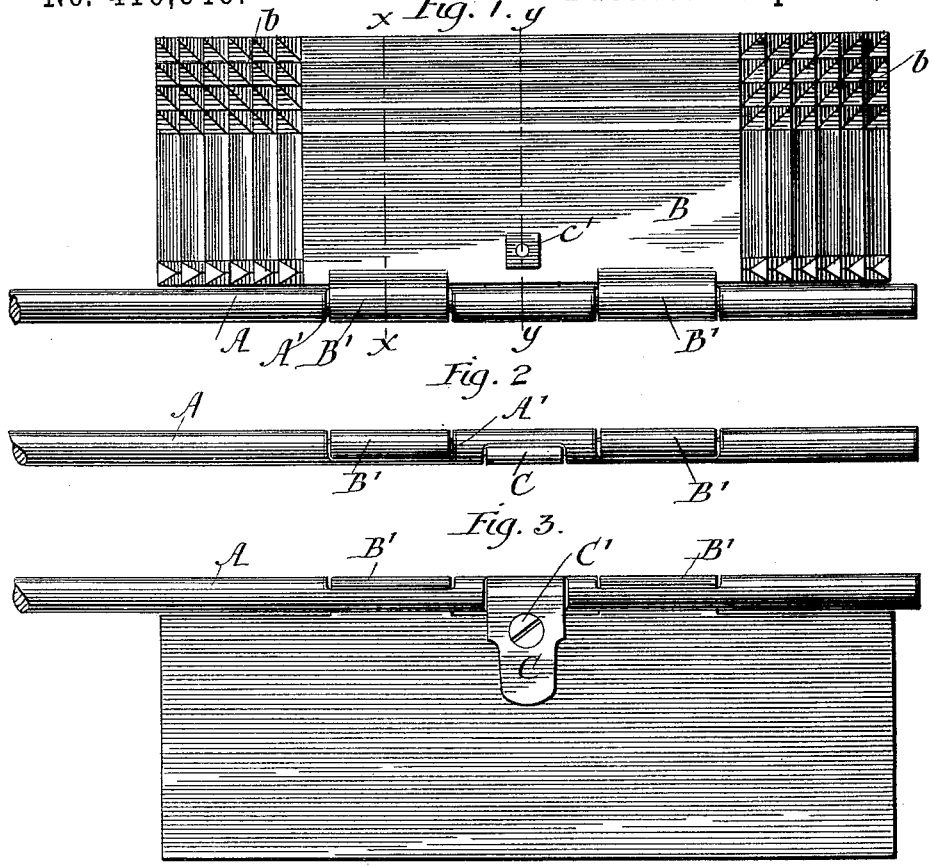
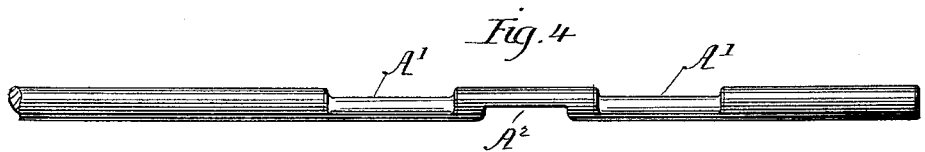
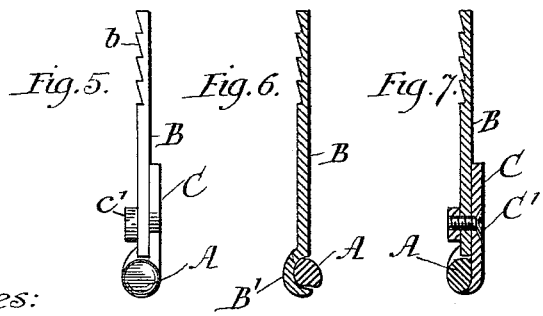
Witnesses:
Ambrose Risdon
F. L. Stevens
Inventor
William C. Metzner
by Cyrus Kehr
Atty.

UNITED STATES PATENT OFFICE.

WILLIAM C. METZNER, OF CHICAGO, ILLINOIS.

STOVE-DAMPER.

SPECIFICATION forming part of Letters Patent No. 410,646, dated September 10, 1889.

Application filed June 15, 1889. Serial No. 314,451. (No model.)

*To all whom it may concern:*

Be it known that I, WILLIAM C. METZNER, a citizen of the United States, residing at Chicago, in the county of Cook and State of Illinois, have invented certain new and useful Improvements in Stove-Dampers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to stove-dampers designed more particularly for use in the horizontal flues of cooking-stoves. The damper may be manufactured of a certain size to fit a particular stove, or it may be made of some chosen maximum size and provided with breaking-grooves, whereby it may be reduced in dimensions to fit various stoves. When manufactured for the stove-repair trade, it should be provided with the breaking-grooves, so that one size kept in stock will serve for repairing a variety of stoves.

The object is to reduce the weight and thickness of the damper. As heretofore made the work has been clumsy when it was so made as to be sufficiently strong. I have now succeeded in making a strong damper, much reduced in size and yet having its parts separable, and the damper being of much neater form.

In the accompanying drawings, Figure 1 is a side elevation showing the damper turned upwardly, as when it closes a flue. Fig. 2 is a bottom view showing the joints formed along the shaft. Fig. 3 is a side elevation showing the shaft uppermost. Fig. 4 is a separate view of the shaft. Fig. 5 is an end view of the damper. Fig. 6 is a section in line $x\ x$ of Fig. 1. Fig. 7 is a section in line $y\ y$ of Fig. 1.

A is the shaft. B is the blade. C is a clip used in binding the blade B to the shaft A.

$B'\ B'$ are tongues extending outwardly from the edge of the blade B adjacent to the shaft A and curved properly to lie in recesses $A'$ in the side of the shaft. Said recesses $A'$ extend partially around the shaft A and are of proper depth to receive the tongues $B'$ to a sufficient depth to cause the outer surfaces of said tongues to be substantially even with the general surface of the shaft A, so that at said points the entire damper is no thicker than the general thickness of the shaft A. Said tongues should be cast integrally with the blade B. On the side of the shaft A opposite the recesses $A'$ and between the latter is a similar recess $A^2$, sufficient space being left between the ends of the recess $A^2$ and the adjacent ends of the recesses $A'$ to make a thickness of metal equal to the thickness of the metal in the shaft along the length of the recesses $A'$ and the recess $A^2$. Thus the strength of the shaft A is made substantially equal over the entire portion to which the blade B is applied. The bottom of the recess $A^2$ is rounded but little, if any.

The clip C is applied to the side of the blade B opposite the tongues $B'$ and between the latter, so as to rest in the recess $A^2$. The end of said clip extending beyond the blade B is turned inwardly, so as to fit into the recess $A^2$, and its outer face is curved and reduced sufficiently only to fill the space $A^2$, so that at this point the general thickness of the shaft A is not increased. A screw-bolt $C'$ extends through the clip C and the blade B and has its head countersunk in said clip. Said bolt binds said clip closely to said blade and draws the tongues of said blade and the outer portion of said clip tightly against the shaft A in their respective recesses.

As already explained, the tongues $B'\ B'$ and the clip C are placed within the recesses $A'\ A'$ and $A^2$ in such manner as to bring their outer surfaces in line with the general surface of the shaft A. Thus the damper along the entire length of said shaft is no thicker than the general thickness of the shaft. In manufacturing it is preferable to make the blade B and the clip C thin. Since the head of the bolt $C'$ is countersunk in the clip C, the thickness of the damper is not increased by said head. On the opposite side the nut $c'$ may be sufficiently small to make the entire thickness of said nut, the blade B, and the clip C no greater than the general thickness of the shaft A.

I claim as my invention—

In a stove-damper, the combination of the shaft A, having the recesses A' on one side thereof and having a recess A² on the other side thereof and between said recesses A', a space being left between the ends of the recesses A' A' and the recess A², a blade B, having tongues B' lying in the recesses A' A', a clip C applied to the blade B and extending into the said recess A², and a bolt C' extending through said clip and said blade and binding said clip and said blade to said shaft, substantially as shown and described.

In testimony whereof I affix my signature in presence of two witnesses.

WILLIAM C. METZNER.

Witnesses:
M. R. HARRIS,
CYRUS KEHR.